US006263980B1

(12) United States Patent
Wadge

(10) Patent No.: US 6,263,980 B1
(45) **Date of Patent: *Jul. 24, 2001**

(54) POWER TOOL

(75) Inventor: Brian Wadge, Spennymoor (GB)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,469

(22) Filed: Aug. 25, 1998

(30) Foreign Application Priority Data

Aug. 30, 1997 (GB) .................................................. 9718337

(51) Int. Cl.$^7$ ...................................................... B23B 45/02

(52) U.S. Cl. ............................ 173/217; 173/29; 173/170; 173/171

(58) Field of Search .................................... 173/217, 216, 173/29, 171, 162.2, 162.1, 170

(56) References Cited

U.S. PATENT DOCUMENTS

| | | | | |
|---|---|---|---|---|
| 3,772,542 | | 11/1973 | Hallerback | 310/50 |
| 4,081,704 | * | 3/1978 | Vassos et al. | 173/217 |
| 4,597,453 | * | 7/1986 | Kilmer et al. | 173/171 |
| 5,033,552 | * | 7/1991 | Hu | 173/217 |
| 5,170,851 | * | 12/1992 | Kress et al. | 173/29 |
| 5,394,039 | * | 2/1995 | Suchdev et al. | 173/162.2 |
| 5,624,000 | * | 4/1997 | Miller | 173/217 |

FOREIGN PATENT DOCUMENTS

| | | |
|---|---|---|
| 19 02 315 | 10/1964 | (DE) . |
| 2 288 588 | 10/1995 | (GB) . |

* cited by examiner

*Primary Examiner*—Scott A. Smith
(74) *Attorney, Agent, or Firm*—Bruce S. Shapiro

(57) ABSTRACT

A power tool (2) includes a motor (22) pivotally mounted within the housing of the tool. The tool is able to accept any one of a plurality of attachment members (32). The motor (22) is adapted to pivot in order that accurate axial alignment with any one of the attachment members presented to the motor occurs.

27 Claims, 6 Drawing Sheets

POWER TOOL

BACKGROUND OF THE INVENTION

1. Field of the Invention

The present invention relates to a power tool and has particular although not exclusive, relevance to battery powered tools.

2. Description of the Related Art

It is conventional for power tools to be designed and built for a dedicated purpose, such as a drill, a jigsaw or a sander. If the user needs to undertake a sanding operation he will use a dedicated sander. If then he needs to drill a hole in a workpiece he will swap the sander for a dedicated drill, and so on.

Whilst such swapping over of dedicated tools is not inconvenient, it does mean that, particularly for the person who needs to use power tools relatively infrequently, considerable expense is incurred in acquiring a broad range of these dedicated power tools.

Furthermore, in the case of so-called "cordless" or battery-powered tools, the user will either need to change the battery pack when changing dedicated tools, or have several ready-charged batteries available for use. These alternative options are cumbersome or expensive respectively.

Solutions to the above problems have been proposed in the past and one such solution entails providing a power tool including a motorised drive which is capable of accepting any one of a plurality of discrete attachments which achieve a dedicated purpose. This means that rather than purchasing a dedicated entire power tool for each job, the user only has to purchase a dedicated attachment (which is cheaper than a dedicated entire tool) and just swap these over as and when necessary.

There still exist certain problems with such solutions, however. In a system such as the discreet attachments described above, it is important to achieve a high degree of alignment between the body of the tool providing the drive and the attachment which receives the drive. In the case of a rotational drive such as a drive shaft, a high degree of axial alignment between the driving and driven shafts is imperative in order to achieve an efficient transfer of energy between the two and also to avoid creating unnecessary mechanical wearing at the interface between the shafts.

BRIEF SUMMARY OF THE INVENTION

It is an object of the present invention to at least alleviate the aforementioned shortcomings by providing a power tool including a body portion defining a handle and a motor mounted within the body portion, which motor is arranged to drive an output spindle of the tool; the body portion further defining an opening around the output spindle, which opening accepts any one of a plurality of attachment members presented thereto, the power tool characterised in that the motor is mounted within the housing by apluralty of supports spaced along the axial length of the motor and wherein at least one of the supports of the plurality does not rigidly contact the motor, thereby to permit the motor to move within its mounting. Thus, by enabling the motor of the body portion of the tool to move, a high degree of axial and positional alignment between the output spindle of the motor and the rotational drive of the attachment may be achieved because this degree of movement permits of automatic co-axial alignment between the two parts.

Preferably at one end of the axial length of the motor a plurality of supports make rigid contact therewith and at the other end of the axial length of the motor at least one of the supports of the plurality do not rigidly contact the motor thereby allowing themotor to pivot about the point at which it is in rigid contact with the said supports. By provision of pivoting movement of the motor, the amount of movement, or "play" exhibited by the motor may be limited and have any unnecessary movement avoided. Additionally or alternatively the motor, at either end of its axial length, is formed in circular cross-section and the supports of the plurality are found therearound. This shape permits a method of construction of the power tool which is relatively easy to assemble.

In a preferred embodiment the plurality of supports is formed from, or integrally with, the body portion itself.

Also the body portion may be formed in two halves which two halves come together and thereby encapsulate the motor therewithin.

Furthermore movement of the motor within the housing, relative to an attachment member, when presented to the tool, is prevented. Also the motor may itself, be connected to the output spindle.

BRIEF DESCRIPTION OF THE DRAWINGS

The present invention will now be described, by way of example only and with reference to the accompanying drawings, of which.

DETAILED DESCRIPTION OF THE PREFERRED EMBODIMENT

Figure 1:
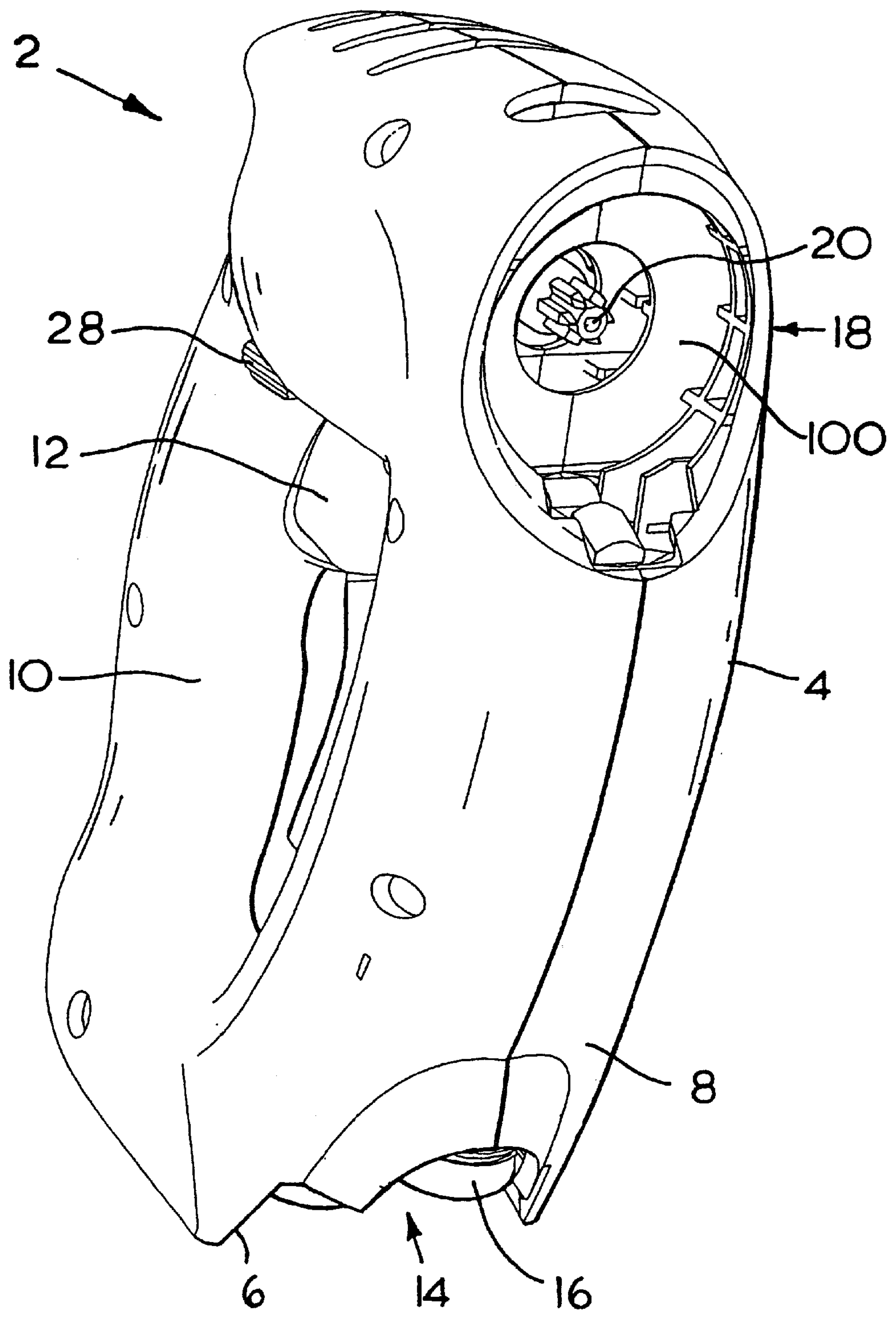
FIG. 1 shows a front perspective view of a body portion of a power tool in accordance with the present invention.

By referring firstly to FIG. 1, a power tool shown generally as (2) includes a body portion (4) formed from two halves of a plastics clamshell. The two halves (6,8) co-operate together to encapsulate the internal mechanisms of the power tool, which will be described here below. The body portion (4) defines a handle (10) which in use of the tool (2) is grasped by the user. The handle (10) is so shaped to provide the user with easy access to an actuating trigger (12) in the form of a pistol grip, which is conventional in the art of power tools. The body portion (4) is formed from the two halves of clamshell (6,8) also to define an opening shown generally as (14), through which batteries (16) for powering the tool may pass. Those skilled in the art will appreciate that the choice of batteries for powering the tool (2) depends upon the work which the tool is required to undertake. The batteries per se form no part of the present invention and so will not be described in any more detail herein.

At the opposite end of the body portion (4) from the battery opening (14) the two halves of the clamshell (6,8) define an opening (18) through which an output spindle (20) of a motor (22) housed within the body portion (4) (and shown in more detail in FIG. 2) is mounted.

By referring now also to FIGS. 2 and 3, the internal mechanism of the tool (2) will be described in more detail.

Figure 2:
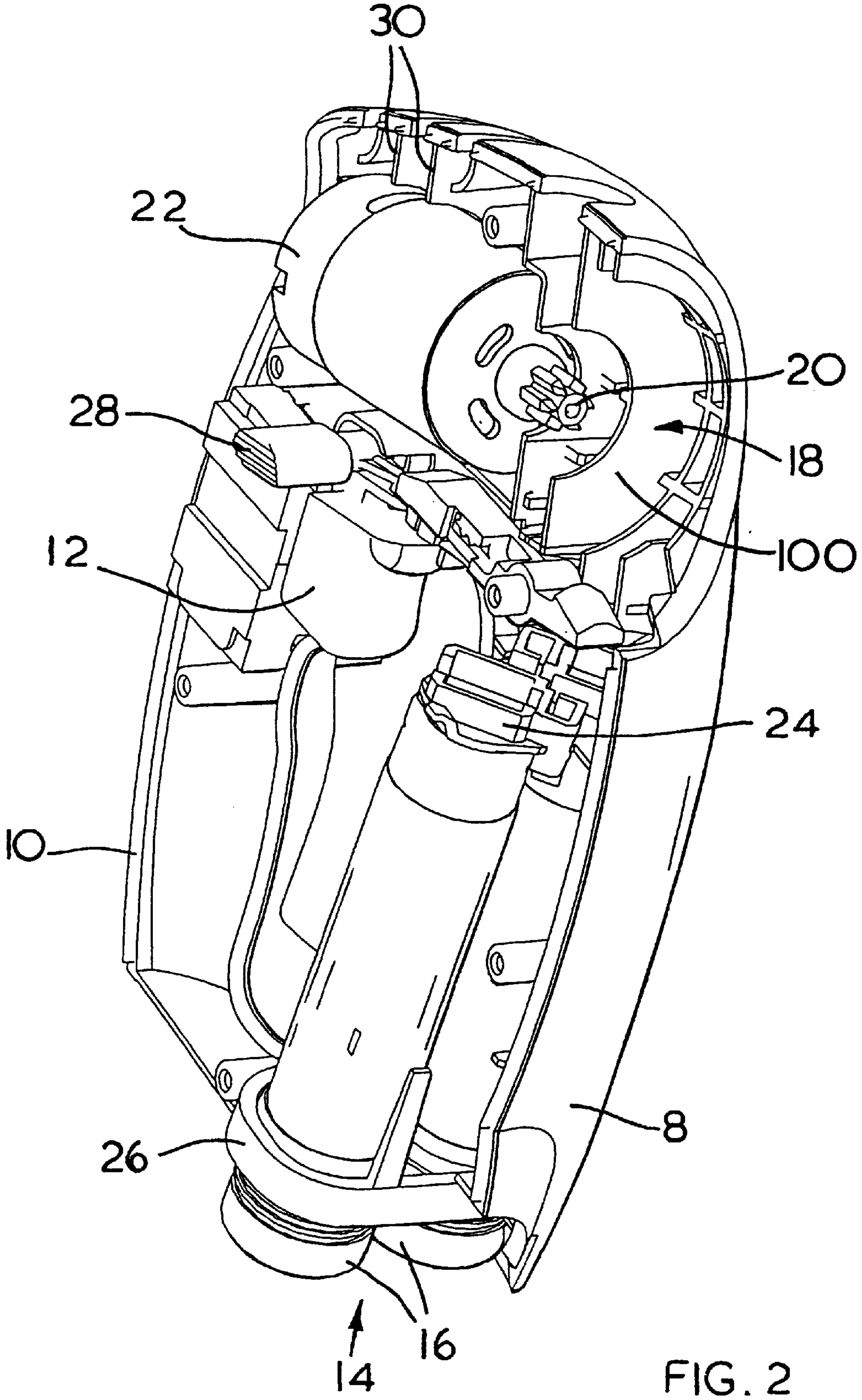
FIG. 2 shows a part cut-away view of the body portion of FIG. 1.
Figure 3:
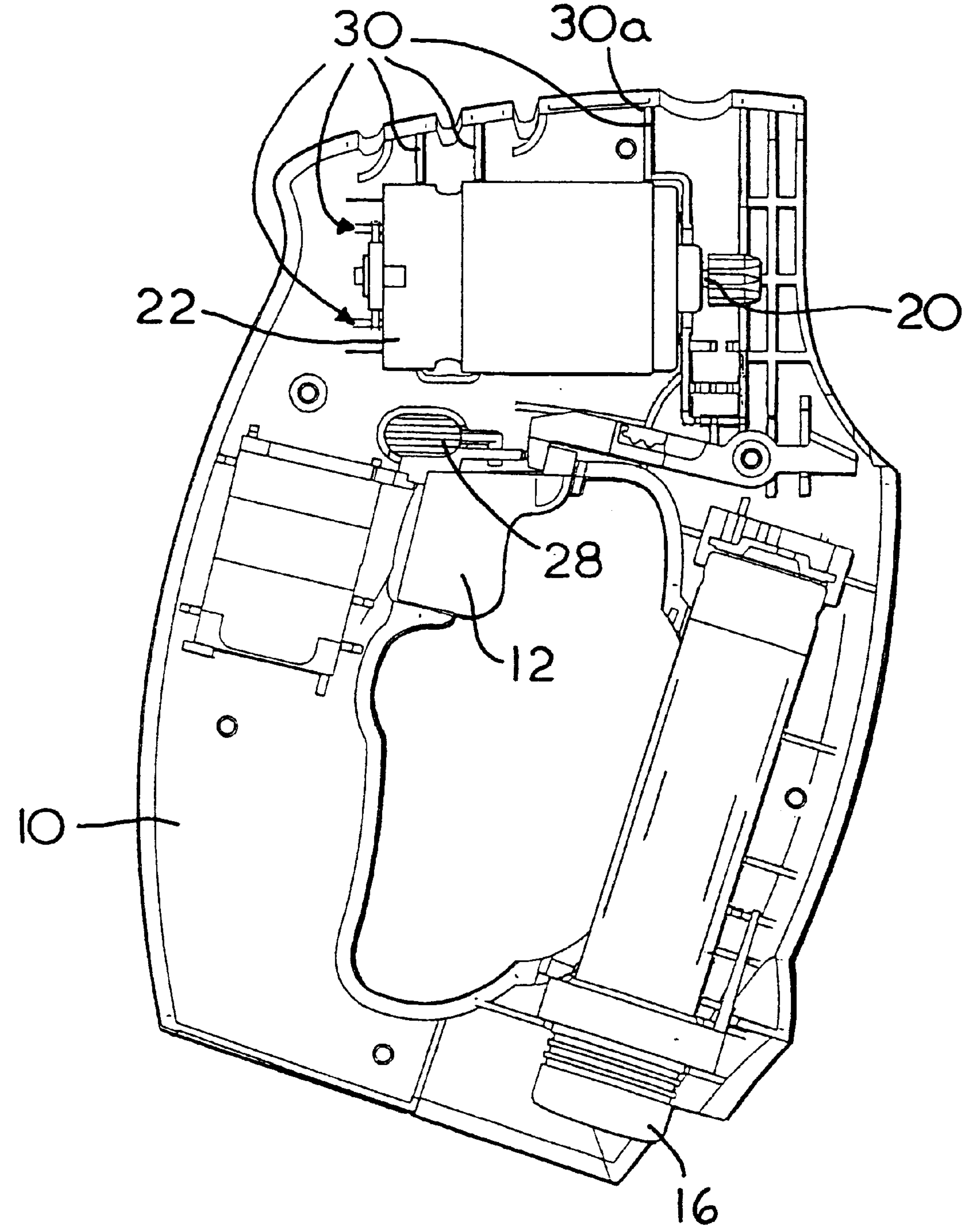
FIG. 3 shows a side part-sectioned view of the body portion of FIG. 1 without an attachment member presented thereto.

In FIG. 2 it will be understood that the half clamshell (6) has been removed for clarity. It can be seen that through the battery opening (14) a pair of batteries (16) have been passed and are electrically coupled via terminals (24) and switch (12) to the motor (22). The batteries (16) are retained within their opening (14) by a detent mechanism (26) which can be manually operated in order to allow the removal of the batteries (16) from the body portion (4).

The motor (22) is selectively coupled to the batteries (16) via the switch (12) in conventional manner. On activation of the switch (12) the user selectively couples the motor (22) to the battery (16) thereby energising the motor (22) which in turn provides a rotational force upon the output spindle (20). In example shown the output spindle (20) has connected thereto a cog for reasons which will become apparent hereinafter.

As is conventional in the art of power tools the motor (22) is provided with a forward/reverse switch (28) the operation of which determines the sense of rotation of the output spindle (20).

Whilst remembering of course that the half clamshell (6) is not shown in FIG. 2, although the motor (22) is mounted within the body portion (4), a plurality of ribs (30) actually provide support to the motor (22) within the body portion (4). The ribs (30) can be seen more clearly from FIGS. 2 and 3. It is important to note that in the example shown in these figures, the foremost rib (labelled 30(a)) does not actually contact the motor (22) itself, but stops slightly short thereof.

It will be apparent that due to the foremost rib (30(a)) not directly contacting the motor (22) itself, that therefore the motor (22) has a slight degree of movement within its mounting position provided by the plurality of ribs (30). It will also be apparent to those skilled in the art that any one or ones of the combination of the plurality of ribs (30) may stop short of directly contacting the motor (22). The direct contact between the ribs (30) and the motor (22), when it does occur, needs to be rigid thereby to provide a good degree of support to prevent the motor (22) moving at this point of contact. Where the rib (30(a)) is deliberately designed to stop short of and therefore not form any direct or rigid contact with the motor (22), then this permits for movement of the motor (22) relative to the rib (30).

Figure 5:
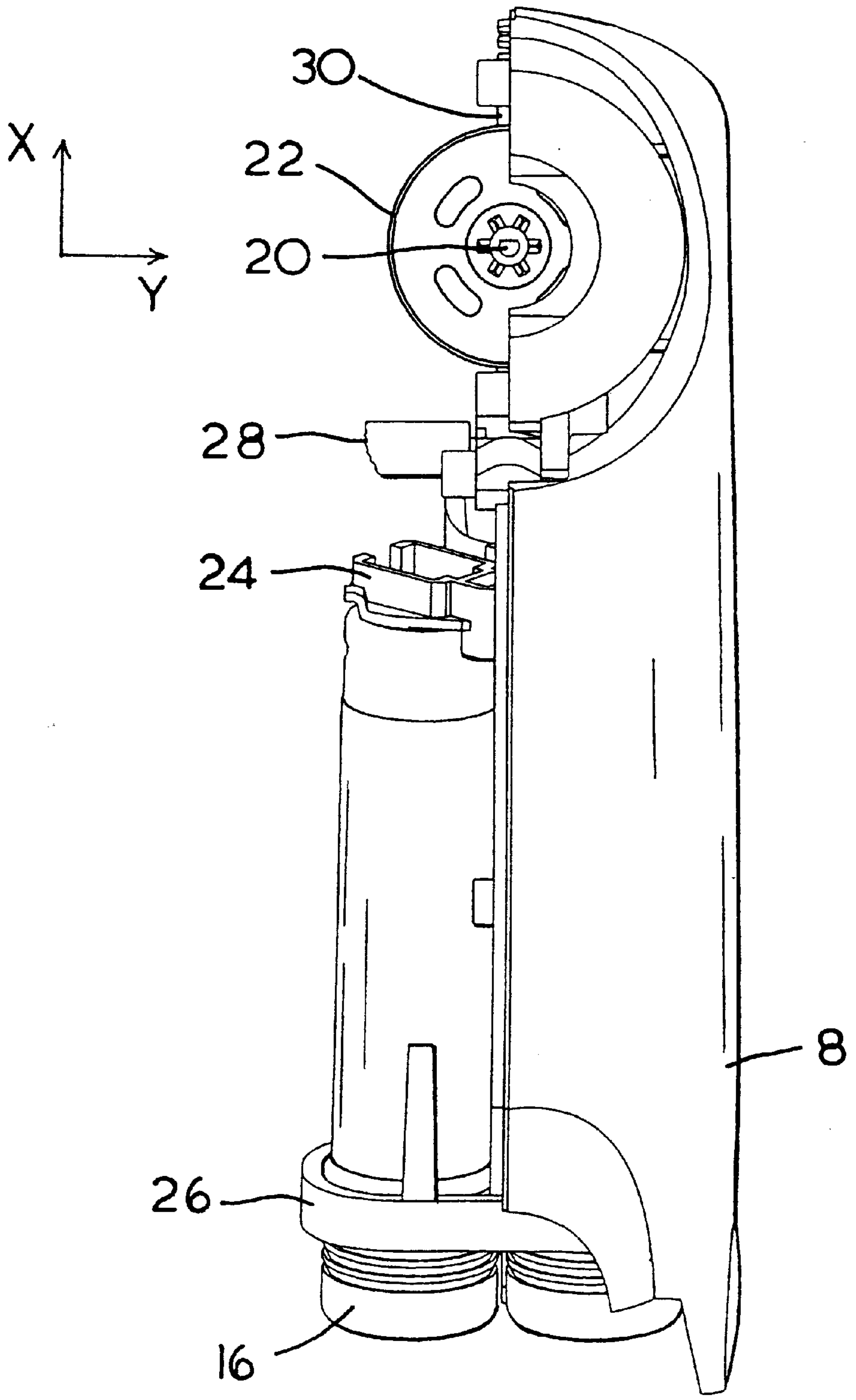
FIG. 5 shows an end-on part cut-away view of FIG. 4.

Because in the example shown the foremost rib (30 (a)) allows a small degree of movement of the motor (22) adjacent thereto, it will be apparent that the output spindle (20) will thus have a slight degree of movement or "play". This degree of "play" occurs in a plane defined by an orthogonal set of axis (conventionally termed x-y). The x-y axis within which the spindle (20) is free to have a limited degree of movement is shown more clearly in FIG. 5.

Figure 4:
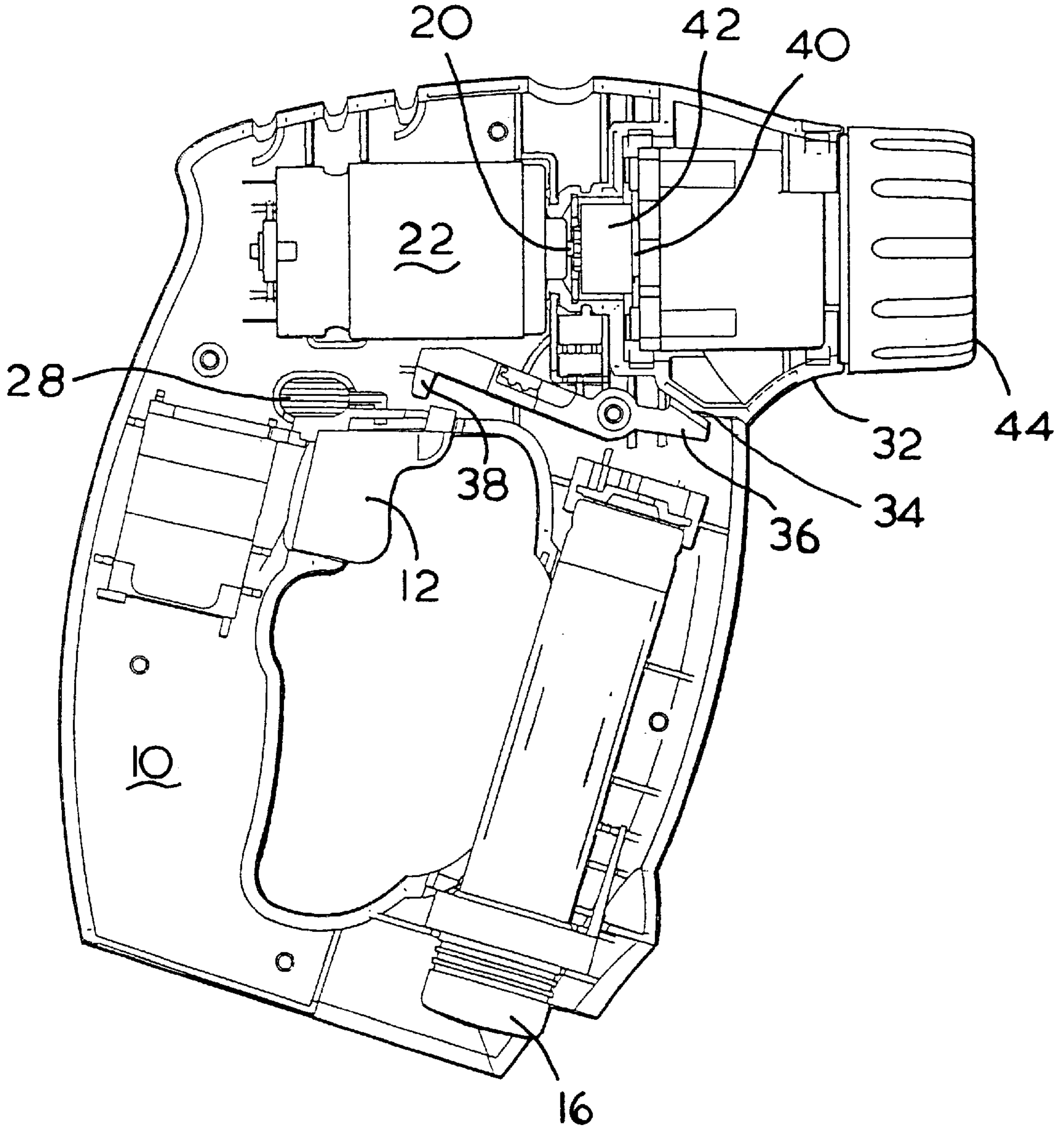
FIG. 4 shows a side part-sectioned view of the body portion of FIG. 1 with an attachment member presented thereto.
Figure 6:
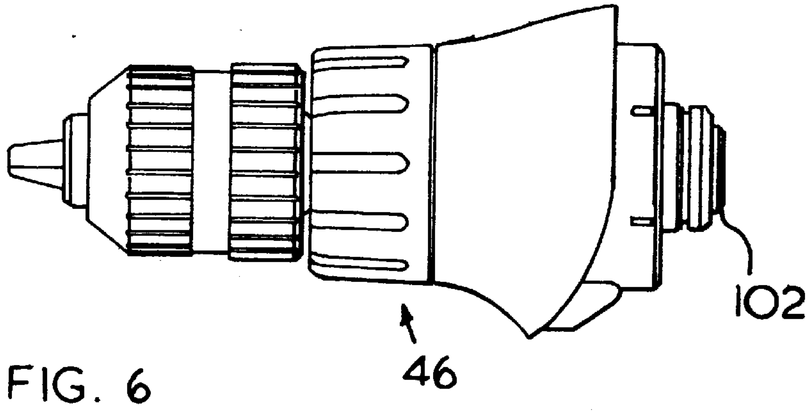
FIG. 6 shows a side view of one of the plurality of attachment members to be presented to the body portion. This is a drill/driver mechanism for a drill.

Referring now particularly to FIGS. 4 and 6 in addition to all other FIGS. 1 to 3 and 5, it can be seen that a power tool (2) has had presented thereto an attachment member (32), in this example a drill/driver mechanism (32) for driving a drill bit. It can be seen that the drill/driver mechanism (32) is presented to the body portion (4) at the opening (18) for the output spindle (20). The outer periphery of the drill/driver mechanism (32) is shaped so as to co-operate within the opening and mate with the outer periphery of the body portion (4). A plate member (100) defining a circular hole is formed from the body portion (4) within the opening (18). The plate member (100) is arranged to have a diameter substantially the same as the diameter of the outer periphery of the foremost tapered armular flange (102) formed on the drill/driver mechanism (32). Due to the substantial matching of these diameters, on presentation of the drill/driver mechanism (32) to the opening (18), the insertion of annular flange (102) into plate member (100) the former will be accurately located within the latter. The taper on the front face of flange (102) serves to aid the accurate location necessary. As the drill/driver mechanism (32) is brought into position a tapered protrusion (34) thereof abuts against a pivotally moveable release mechanism (36). When this occurs the right-hand side of the pivotal release mechanism (36) moves down as one views FIG. 4, and the left-hand side moves up thereby allowing the projecting peg (38) to be removed from its previously biased position wherein it held the switch (12) permanently open. This provides a form of safety release mechanism which prevents accidental actuation of the switch (12) until such times as the attachment member, or, as in this example, the drill/driver mechanism (32) is in position.

The attachment member (32) has a driven spindle (40) to which is coupled at its end a female cog member (42) which is designed to engage with the male cog on the output spindle (20) of the motor. It will be appreciated that when the male and female cogs of the output spindle (20) and the driven spindle (40) mate together, then actuation of the motor (22) will cause simultaneous rotation of the output spindle (20) and the driven spindle (40) thereby rotating the head (44) of the drill/driver mechanism (32).

It is the presentation of the drill/driver mechanism (32) to the opening (18) of the body portion (4) which requires a more detailed description of the movement of the motor (22) within its plurality of mounted ribs (30). As the motor (22) axis is free to conically pivot slightly about its rear mounting portion defined by those of the plurality of ribs (30) which sit in rigid direct contact with the motor, this therefore allows an automatic alignment to occur between the axis of rotation of the motor spindle (20) and the axis of rotation of the driven spindle (40). If this were not the case, i.e. if the motor were not free to move slightly, then on presentation of the drill/driver mechanism (32) to the opening (18), there will be no guarantee of an accurate axial alignment of both the motor (22) and its output spindle (20) for the drill/driver mechanism (32) and its driven spindle (40).

It will be apparent that the motor (22) is formed in circular cross-section this is chosen as being advantageous for allowing the ribs (30) of the plurality thereof to be shaped so as to accommodate the motor (22) more easily. There is no necessity for the motor (22) to have a circular cross-section or indeed the drill/driver mechanism (32) or their respective spindles (20,40).

The ribs (30) of the plurality thereof have been formed from the plastics material of the clamshell halves (6,8). If desired the ribs (30) could be formed from separate members such as metal or other plastics members glued or otherwise stuck to the clamshell halves (6,8).

Figure 7:
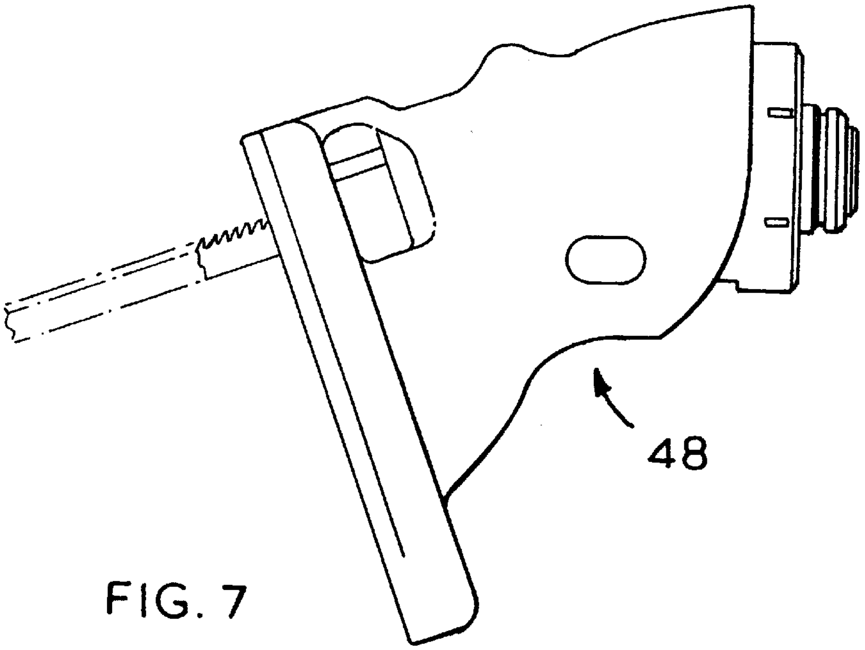
FIG. 7 shows an alternative attachment to FIG. 6, this being a jigsaw attachment.
Figure 8:
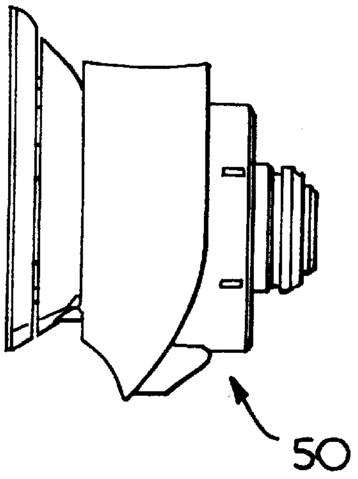
FIG. 8 shows yet another attachment, this being a sander.

Referring now briefly to FIGS. 6 to 8, different ones of the plurality of attachment members are shown.

FIG. 6 shows a drill attachment (46) for presenting to the body portion (4) and coupling thereto via the opening (18). FIG. 7 shows a jigsaw attachment (48) and FIG. 8 shows a sander attachment (50). Whilst those skilled in the art will appreciate that the internal mechanisms of each of the attachment members (46, 48 and 50) will be different and adapted to suit the purpose of each attachment member, this is not germane to the present invention and so will not be described herein. For the purposes of the present inventions, it is sufficient to appreciate that each of these attachment members (46, 48 and 50) must be presented and coupled to the body portion (4) as already herein described.

It will be understood by those skilled in the art that the term "rigid" is intended to cover solid, rather than resilient contact. Thus it would be possible to form the ribs (30) of a resilient material which permanently contacted the motor (22), or indeed coat the motor in a resilient material, such as silicone rubber, whilst still remaining within the scope of the present invention.

What is claimed is:

1. A power tool system comprising:

a common body portion including a housing defining a handle and a motor mounted within the housing, the motor having a front end and a rear end and arranged to drive a rotatable drive spindle extending from the front end, the housing further defining an opening around the rotatable output, the motor mounted within the housing by a plurality of supports spaced along the axial length of the motor, a first of the plurality of supports being adjacent one of the front end and the rear end and radially spaced from the motor and a second of the plurality of supports being adjacent the other of the front end and rear end and in direct contact with the motor to preclude radial movement of the motor relative to the second support;

a plurality of attachment members each selectively and releasably attachable to the common body portion, each of the plurality of attachment members including a working portion driven by a driven spindle, the driven spindle for engaging the rotatable drive spindle;

whereby a small degree of radial movement between the motor relative to the first of the supports is permitted prior to releasable attachment of one of the attachment members to the common body portion and said small degree of radial movement is precluded upon releasable attachment of one of the attachment members to the common body portion.

2. A power tool according to claim 1 wherein at one end of the axial length of the motor a plurality of supports make rigid contact therewith and at the other end of the axial length of the motor at least one of the supports of the plurality is spaced from the motor thereby allowing the motor to pivot about a point at which it is in rigid contact with the said supports.

3. A power tool according to claim 2 wherein the other end of the axial length of the motor is the output end of the motor.

4. A power tool according to claim 1 wherein the motor, at either end of its axial length, is formed in circular cross-section and the supports of the plurality are found therearound.

5. A power tool according to claim 1 wherein the plurality of supports is formed from, or integrally with, the body portion itself.

6. A power tool according to claim 1 wherein the body portion is formed in two halves, which two halves come together and thereby encapsulate the motor therewithin.

7. A power tool according to claim 1 wherein movement of the motor within the housing relative to a selected one of the plurality of attachment members prevented when the selected one is attached to the common body portion.

8. A power tool according to claim 1 wherein the motor is connected to the output spindle.

9. A power tool comprising:

a tool housing;

a motor having a generally cylindrical body and a rotatable output spindle, the generally cylindrical body having a front end and a rear end, the rotatable output extending from the front end;

a tool head releasably attachable to the tool housing, the tool head including a driven spindle for engagement with the rotatable output spindle; and a plurality of ribs spaced axially along a length of the motor for supporting the motor, a first rib of the plurality of ribs disposed adjacent a front end of the body and defining at least a portion of a circular opening with a rigid diameter slightly larger than a diameter of the generally cylindrical body such that the rigid diameter is radially spaced from and allows a small degree of radial movement of the motor relative to the first rib in any direction substantially perpendicular to the length of the motor prior to releasable attachment of the tool head to the tool housing and a second rib of the plurality of ribs in direct contact with the motor to preclude radial movement of the motor relative to the second rib, said small degree of radial movement of the motor relative to the first rib being precluded upon releasable attachment of the tool head to the tool housing.

10. The power tool of claim 9, wherein the first rib is disposed adjacent an end of the generally cylindrical body.

11. The power tool of claim 10, wherein the driven spindle axially extends from the end of the cylindrical body.

12. The power tool of claim 9, wherein a second rib of the plurality of ribs rigidly contacts the generally cylindrical body.

13. The power tool of claim 12, wherein the plurality of ribs permit the motor to conically pivot slightly about a rear mounting portion defined by the second rib.

14. The power tool of claim 9, wherein the tool housing includes first and second clam shell halves integrally formed to include the plurality of ribs.

15. The power tool of claim 9, wherein the tool head is rigidly attachable to the tool housing such that the small degree of movement of the motor relative to the first rib is prevented when the tool head is attached to the tool housing.

16. The power tool of claim 9, wherein the tool housing includes a plate member defining a circular opening providing access to the output spindle and the tool head includes a generally cylindrical portion having an outer diameter substantially equal to an inner diameter of the circular opening, the cylindrical portion received within the circular opening when the tool head is releasably attached to the tool body.

17. The power tool of claim 16, wherein the cylindrical portion includes a front face having a taper.

18. The power tool of claim 16, wherein the driven spindle is concealed within the cylindrical portion of the tool head.

19. The power tool of claim 16, wherein the output spindle is disposed completely within the tool housing and completely behind the plate.

20. The power tool of claim 9, wherein the power tool is a hand-held power tool.

21. The power tool of claim 9, wherein the tool body defines a handle portion.

22. A power tool comprising:

a tool housing;

a tool head removably attached to the tool housing; and a motor including a generally cylindrical body having a first end and a second end, the motor further including a rotatable output spindle extending from the second end, the motor disposed within the tool housing, the first end radially supported directly by the tool housing and the second end radially supported directly by the tool head such that the first end is radially fixed within the tool housing, rotatable output spindle is radially movable prior to releasable attachment of the tool head to the tool housing, and the tool head precludes radial movement of the rotatable output spindle upon releasable attachment of the tool head to the tool body.

23. The power tool of claim 22, further comprising a plurality of ribs spaced axially along a length of the motor for supporting the motor, a first rib of the plurality of ribs defining at least a portion of a circular opening with a rigid diameter slightly larger than a diameter of the generally cylindrical body such that the rigid diameter allows a small degree of movement of the motor relative to the first rib in any direction substantially perpendicular to the length of the motor prior to releasable attachment of the tool head to the tool housing.

24. The power tool of claim 23, wherein a second rib of the plurality of ribs rigidly contacts the generally cylindrical body.

25. The power tool of claim 23, wherein the tool housing includes first and second clam shell halves integrally formed to include the plurality of ribs.

26. The power tool of claim 23, wherein the plurality of ribs permit the motor to conically pivot slightly about a rear mounting portion defined by the second rib.

27. The power tool of claim 23, wherein the tool housing includes a plate member defining a circular opening providing access to the output spindle and the tool head includes a generally cylindrical portion having an outer diameter substantially equal to an inner diameter of the circular opening, the cylindrical portion received within the circular opening when the tool head is releasably attached to the tool body.

* * * * *